US011297763B2

(12) United States Patent
Collins et al.

(10) Patent No.: US 11,297,763 B2
(45) Date of Patent: Apr. 12, 2022

(54) AGITATION AND LEVELING SYSTEM FOR PARTICULATE MATERIAL

(71) Applicant: CNH Industrial Canada, Ltd., Saskatoon (CA)

(72) Inventors: Ryan D. Collins, Chicago, IL (US); Jared S. Wright, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 523 days.

(21) Appl. No.: 16/265,558

(22) Filed: Feb. 1, 2019

(65) Prior Publication Data
US 2020/0245543 A1  Aug. 6, 2020

(51) Int. Cl.
*A01C 19/00* (2006.01)
*B01F 15/00* (2006.01)
(Continued)

(52) U.S. Cl.
CPC .......... *A01C 19/00* (2013.01); *A01C 15/007* (2013.01); *B01F 7/00408* (2013.01); *B01F 7/08* (2013.01);
(Continued)

(58) Field of Classification Search
CPC .......... B01F 15/00155; B01F 15/00194; B01F 15/00253; B01F 15/0035; B01F 15/00389; B01F 2015/00636; B01F 2215/0013; B01F 7/00258; B01F 7/00408; B01F 7/00433; B01F 7/0065; B01F 7/08; A01C 15/007; A01C 19/00; A01C 7/081; A01C 7/102; A01C 7/107
See application file for complete search history.

(56) References Cited

U.S. PATENT DOCUMENTS 1,947,379 A    2/1934  Cargill
2,657,831 A   11/1953  Pierce
(Continued)

FOREIGN PATENT DOCUMENTS

DE    3817408    11/1989
GB     716743    10/1954
(Continued)

OTHER PUBLICATIONS

CNH America LLC; "1200 Series Advanced Seed Meter Planters"; 2005; from http://www.stjosephequipment.com/console/storage/documents/138124483832957.pdf (36 pages).
(Continued)

*Primary Examiner* — Tony G Soohoo
(74) *Attorney, Agent, or Firm* — Rebecca L. Henkel; Rickard K. DeMille

(57) ABSTRACT

A particulate material agitation and leveling system includes a controller having a memory and a processor. The processor is configured to receive a sensor signal indicative of a measured weight distribution of a particulate material within a storage tank of an agricultural system, determine whether a determined variation between the measured weight distribution and a target weight distribution is greater than a threshold variation, and control an agitator to decrease the determined variation in response to determining that the determined variation is greater than the threshold variation.

20 Claims, 8 Drawing Sheets

(51) Int. Cl.
*A01C 15/00* (2006.01)
*B01F 7/00* (2006.01)
*B01F 7/08* (2006.01)

(52) U.S. Cl.
CPC .. *B01F 15/00194* (2013.01); *B01F 15/00253* (2013.01); *B01F 15/00389* (2013.01); *B01F 2015/00636* (2013.01); *B01F 2215/0013* (2013.01)

(56) References Cited

U.S. PATENT DOCUMENTS

| | | | |
|---|---|---|---|
| 2,755,002 A | 7/1956 | Gustafson | |
| 2,814,421 A | 11/1957 | Buhr | |
| 2,826,344 A | 3/1958 | Weber | |
| 3,129,828 A | 4/1964 | Lusk | |
| 3,180,525 A | 4/1965 | Fabian et al. | |
| 3,430,822 A | 3/1969 | Lienemann et al. | |
| 3,532,232 A | 10/1970 | Sukup | |
| 3,969,614 A | 7/1976 | Moyer et al. | |
| 3,991,668 A * | 11/1976 | De Milt | B30B 9/3007 100/98 R |
| 4,015,366 A | 4/1977 | Hall, III | |
| 4,033,466 A | 7/1977 | Easton | |
| 4,100,538 A | 7/1978 | Knepler | |
| 4,159,064 A | 6/1979 | Hood | |
| 4,875,391 A | 10/1989 | Leising et al. | |
| 4,918,665 A * | 4/1990 | Herfeld | B01F 7/166 241/98 |
| 4,931,229 A | 6/1990 | Krimmel et al. | |
| 4,969,583 A | 11/1990 | Torimitsu et al. | |
| 4,975,845 A | 12/1990 | Mehta | |
| 5,007,590 A | 4/1991 | Taylor | |
| 5,234,128 A | 8/1993 | Hill | |
| 5,553,938 A * | 9/1996 | Faccia | B01F 7/24 366/302 |
| 6,292,741 B1 | 9/2001 | Bitzer et al. | |
| 6,537,177 B2 | 3/2003 | Degroot et al. | |
| 6,715,640 B2 | 4/2004 | Tapphorn et al. | |
| 7,118,268 B2 * | 10/2006 | Van Der Plas | A01K 5/004 366/314 |
| 7,341,372 B2 | 3/2008 | Van Der Plas | |
| 7,640,876 B2 | 1/2010 | Memory | |
| 7,712,321 B2 * | 5/2010 | Kadyk | A23G 9/12 62/136 |
| 7,969,319 B2 | 6/2011 | Kowalchuk | |
| 8,116,954 B2 | 2/2012 | Livshiz et al. | |
| 8,662,972 B2 * | 3/2014 | Behnke | B65G 67/22 460/119 |
| 8,931,425 B2 | 1/2015 | Friggstad | |
| 9,198,343 B2 | 12/2015 | Mariman et al. | |
| 9,366,389 B2 | 6/2016 | Stewart et al. | |
| 9,481,294 B2 | 11/2016 | Sauder et al. | |
| 10,259,140 B1 * | 4/2019 | Derose | B28C 5/1246 |
| 10,687,460 B2 * | 6/2020 | Roberge | B01F 13/0294 |
| 2012/0104032 A1 | 5/2012 | Bahn | |
| 2013/0243562 A1 | 9/2013 | Behnke et al. | |
| 2014/0350801 A1 | 11/2014 | Bonefas et al. | |
| 2015/0118376 A1 * | 4/2015 | Huyzer | A23K 40/00 426/518 |
| 2016/0150724 A1 | 6/2016 | Browning et al. | |
| 2016/0278277 A1 | 9/2016 | Valberg | |
| 2017/0065948 A1 | 3/2017 | Bedord et al. | |
| 2017/0135280 A1 | 5/2017 | Rosengren et al. | |
| 2018/0065639 A1 | 3/2018 | Barath et al. | |
| 2019/0230847 A1 | 8/2019 | Forrest et al. | |
| 2019/0230848 A1 | 8/2019 | Forrest et al. | |
| 2020/0245535 A1 * | 8/2020 | Schilling | A01C 15/007 |
| 2020/0245539 A1 * | 8/2020 | Stuart | B01F 15/00311 |

FOREIGN PATENT DOCUMENTS

| | | |
|---|---|---|
| GB | 2026447 | 2/1980 |
| WO | 2011053286 | 5/2011 |
| WO | 2015023684 | 2/2015 |

OTHER PUBLICATIONS

Alibaba.com; "Abilene Machine 320724A3 New Replacement Grain Delivery Leveling Auger with AFS for Case IH1660 1666 1680 1688 2188 2388++ Combines"; https://guide.alibaba.com/shop/abilene-machine-320724a3-newreplacement-grain-delivery-leveling-auger-with-afs-for-case-h-1660-1666-1680-1688-2188-2388-combines_37019464.htm; retrieved on Aug. 16, 2017 (3 pages).

Dickey-john; "Hopper Level Sensor"; retrieved Aug. 21, 2017 from http://www.dickey-john.com/product/hopper-level-sensor (1 page).

Banner; "Measurement and Level Monitoring" retrieved Jan. 30, 2018 from https://www.bannerengineering.com/us/en/solutions/measurement-and-level-monitoring.html#all (21 pages).

\* cited by examiner

AGITATION AND LEVELING SYSTEM FOR PARTICULATE MATERIAL

BACKGROUND

The disclosure relates generally to an agitation and leveling system for particulate material.

Generally, agricultural seeding implements are towed behind a work vehicle, such as a tractor. These implements generally contain a particulate material, such as seeds, fertilizer, and/or other agricultural product, which is distributed on or in the ground using various methods. Certain implements include a storage tank in which the particulate material is stored and a metering system configured to meter the particulate material from the storage tank. The particulate material is distributed from the metering system to row units, which are configured to distribute the particulate material on or in the ground. As the storage tank is filled with the particulate material and/or while the particulate material flows from the storage tank to the metering system, the particulate material may form an undesirable profile within the storage tank. Several factors may contribute to this undesirable profile, including, but not limited to, friction between the particulate material and the storage tank, clumping of the particulate material, operation of the implement on a slope, and an inactive portion of the metering system. This undesirable profile may lead to uneven flow to the metering system, which may cause an unwanted distribution or no distribution of the particulate material over certain regions of a field. As a result, the crop yield within these regions may be reduced, thereby reducing the efficiency of the seeding process.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particulate material agitation and leveling system includes a controller having a memory and a processor. The processor is configured to receive a sensor signal indicative of a measured weight distribution of a particulate material within a storage tank of an agricultural system, determine whether a determined variation between the measured weight distribution and a target weight distribution is greater than a threshold variation, and control an agitator to decrease the determined variation in response to determining that the determined variation is greater than the threshold variation.

DRAWINGS

These and other features, aspects, and advantages of the present disclosure will become better understood when the following detailed description is read with reference to the accompanying drawings in which like characters represent like parts throughout the drawings, wherein.

Figure 5:
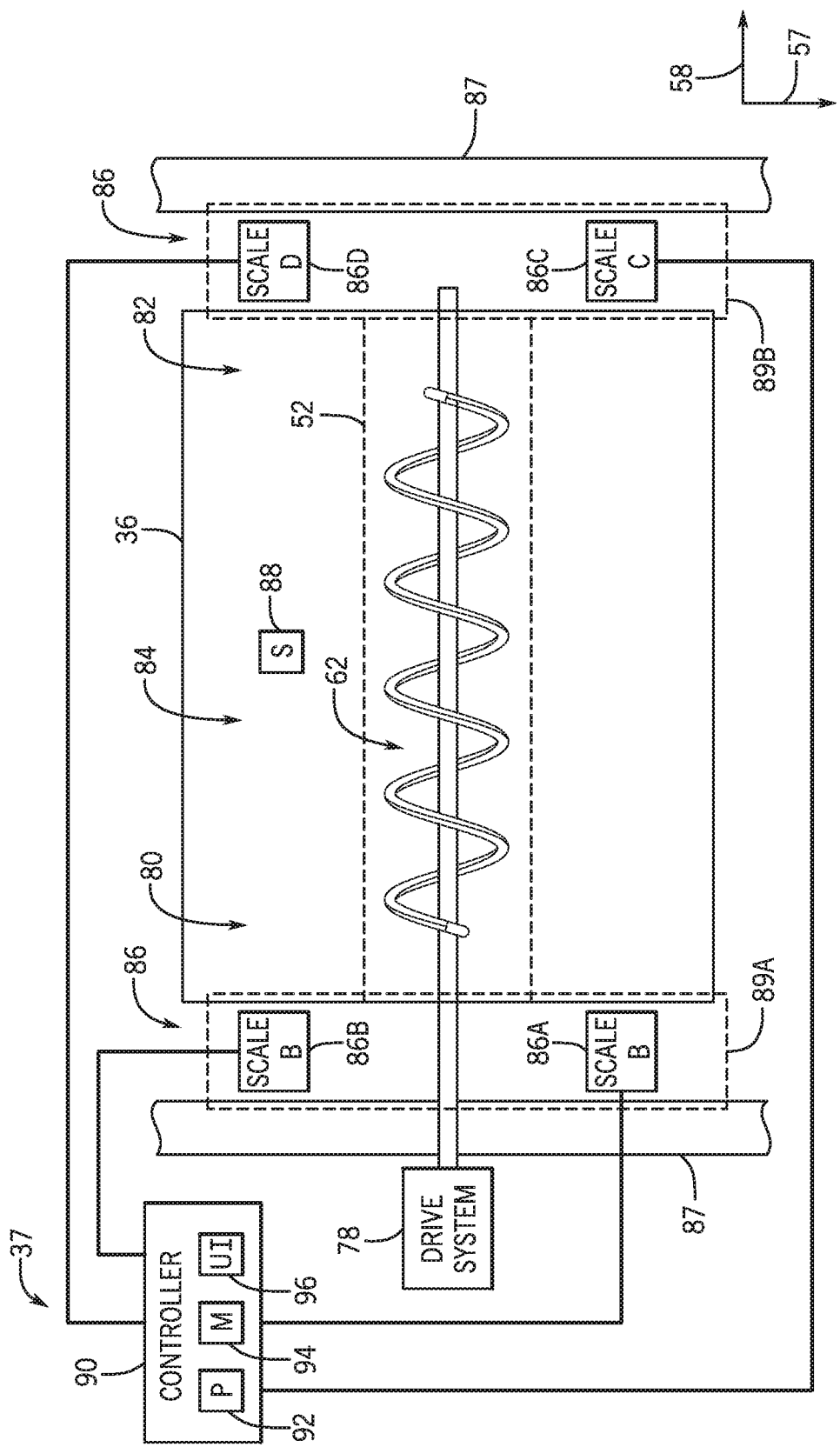
FIG. 5 is a block diagram of an embodiment of a storage tank coupled to the particulate material agitation and leveling system of FIG. 4 from a top perspective, in accordance with an aspect of the present disclosure.
Figure 6:
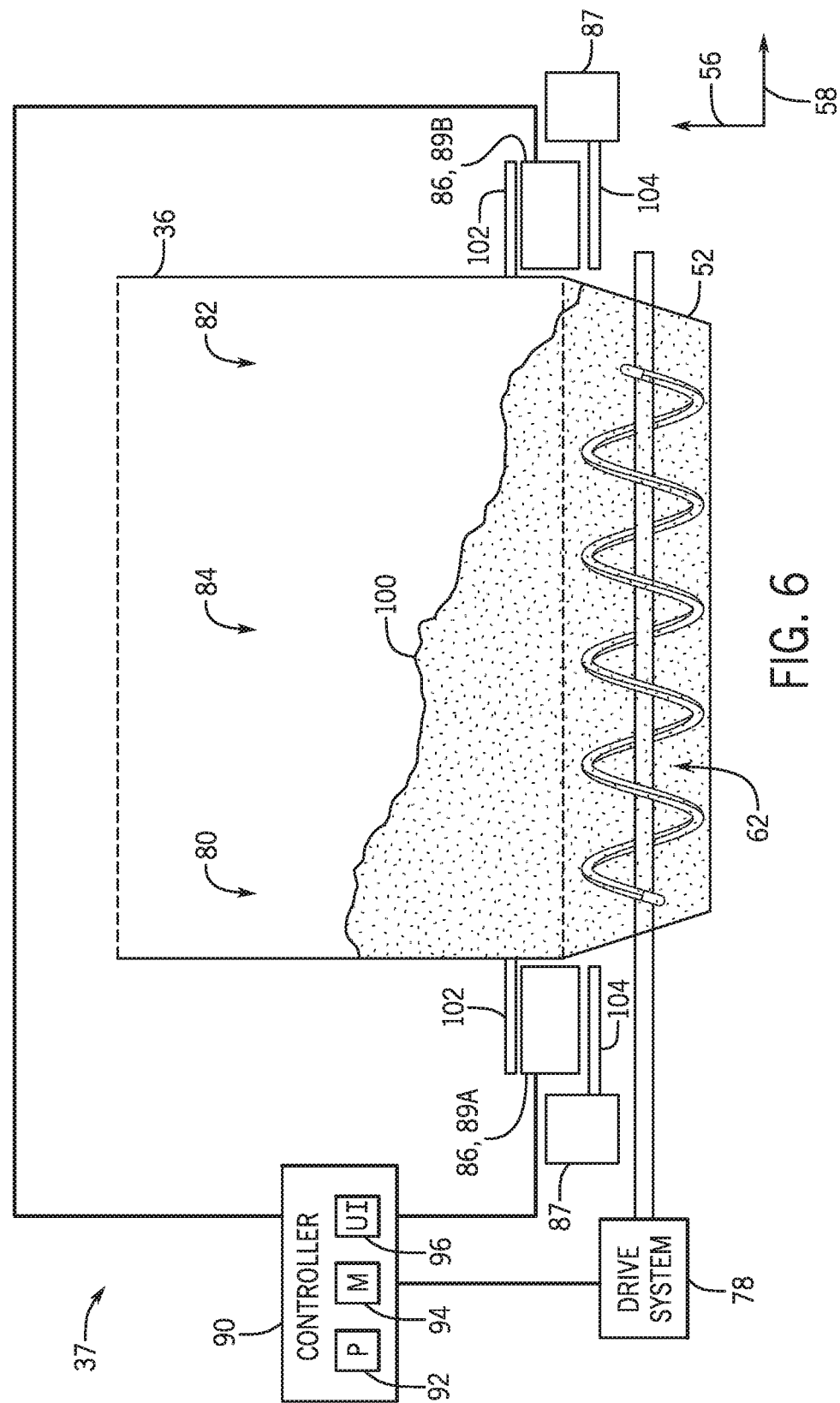
Figure 7:
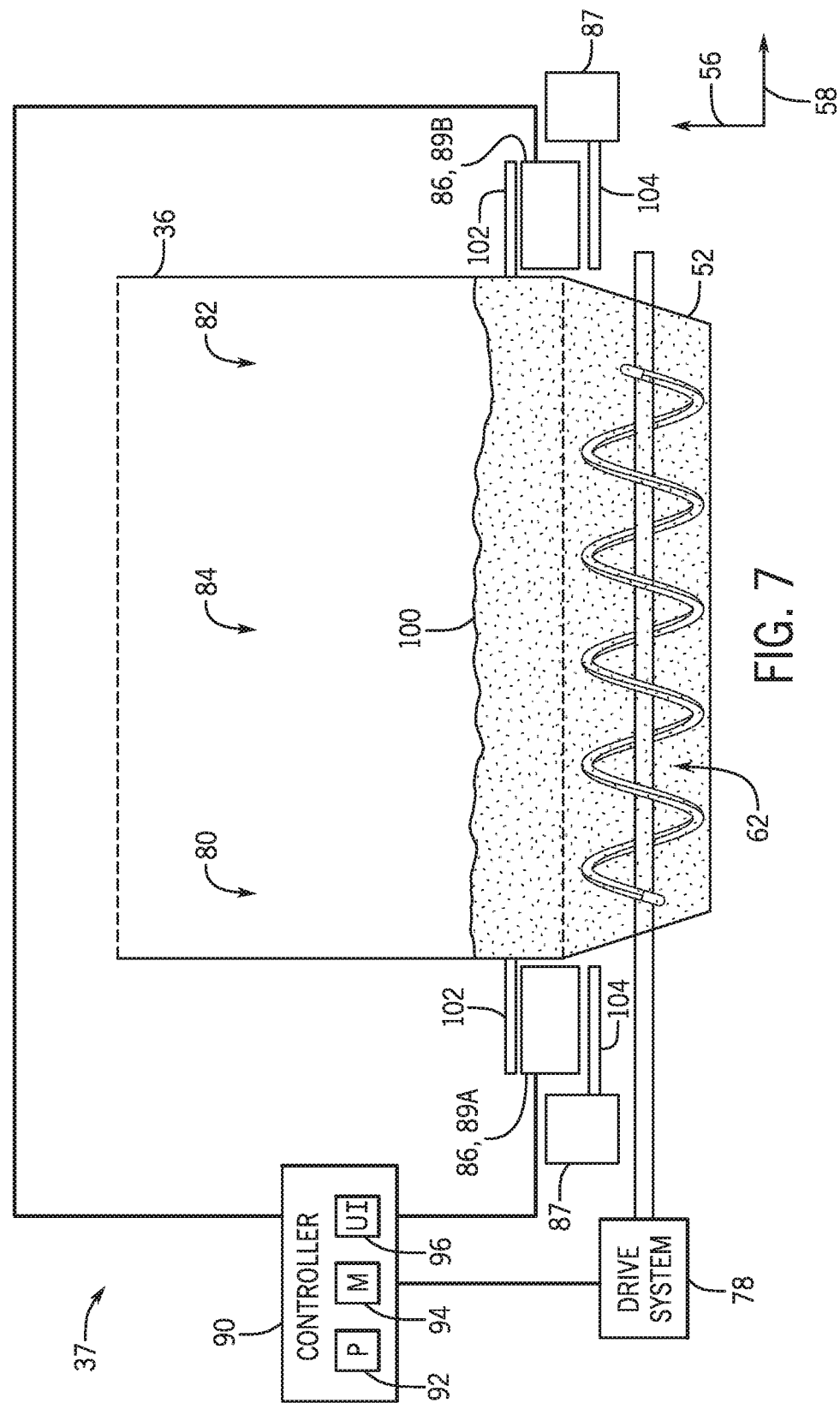
Figure 8:
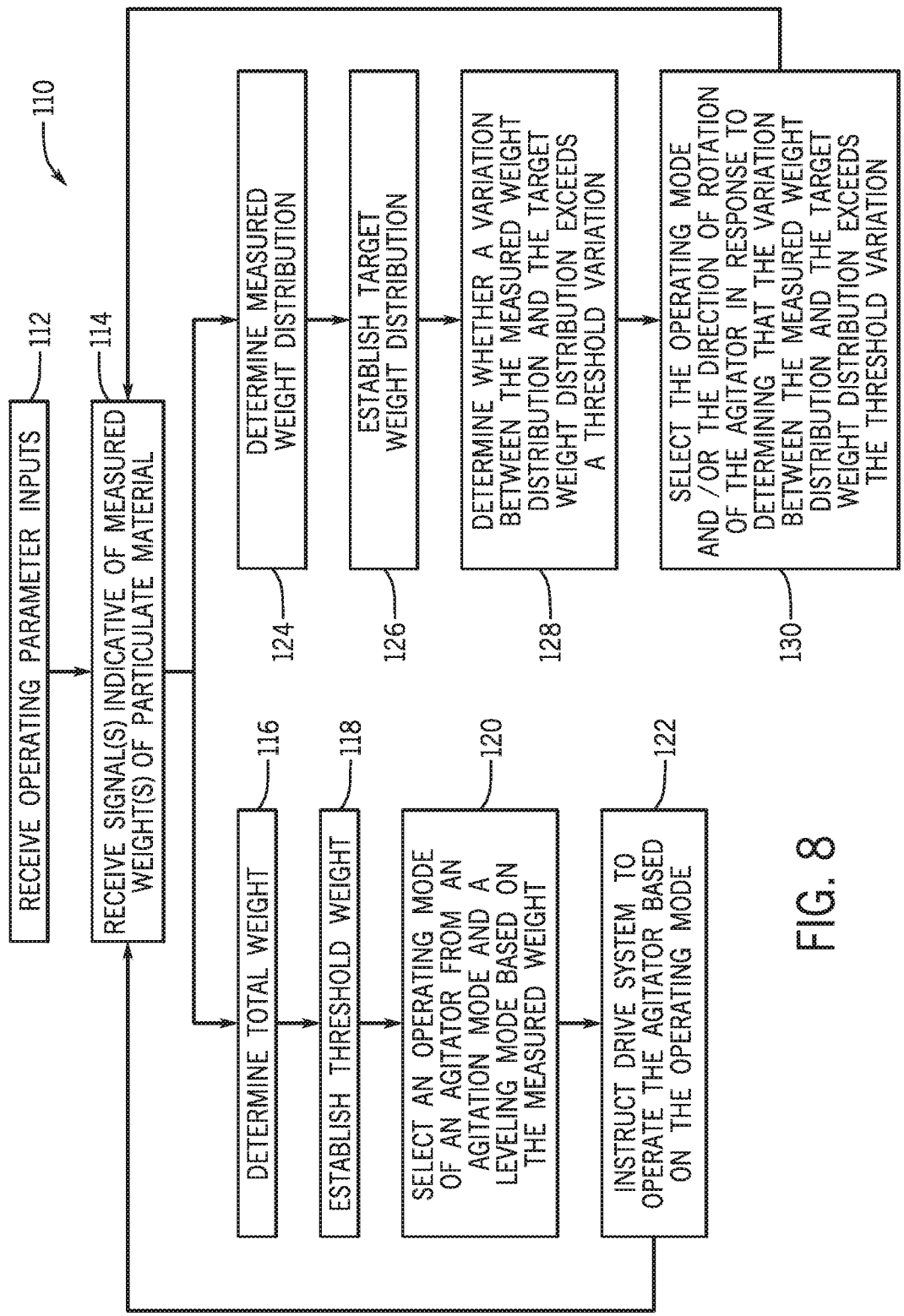

FIGS. 6 and 7 are block diagrams of an embodiment of a storage tank with particulate material disposed therein and coupled to the particulate material agitation and leveling system of FIG. 5 from a side perspective, in accordance with an aspect of the present disclosure; and FIG. 8 is a flow diagram of an embodiment of a process for controlling a particulate material agitation and leveling system, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a particulate material agitation and leveling system. Certain agricultural systems (e.g., air carts, implements, etc.) contain a particulate material (e.g., seeds, fertilizer, and/or other agricultural products) within a storage tank of the agricultural system. Certain agricultural systems include row units and/or are coupled to a respective implement having row units configured to distribute the particulate material within a field. The particulate material may flow from the storage tank through a metering system, which is configured to control the flow of the particulate material to the row units. As the storage tank is filled with the particulate material and/or as the particulate material flows from the storage tank through the metering system, the particulate material may clump together within the storage tank and/or a profile of the particulate material within the storage tank may change to an undesirable profile.

Accordingly, in certain embodiments, the agricultural system includes a particulate material agitation and leveling system configured to reduce clumps within the particulate material and to control the profile of the particulate material. The particulate material agitation and leveling system includes sensor(s), an agitator, a drive system, and a controller. The agitator is configured to agitate and/or level the particulate material within the storage tank and/or within a hopper coupled to the storage tank. The sensors are configured to output signal(s) (e.g., sensor signals) indicative of measured weight(s) and/or a measured weight distribution of the particulate material and the storage tank. In some embodiments, the controller is configured to receive the sensor signal(s) and to determine the measured weight distribution based on the sensor signal(s) and the respective locations of the sensors along the storage tank.

In certain embodiments, the controller is configured to select an operating mode of the agitator based on the measured weight and to control the agitator based on the operating mode. The operating modes of the agitator may include an agitation mode and a leveling mode. For example, while the agitator is operated in the agitation mode, the agitator agitates the particulate material within the storage tank and/or within the hopper. While the agitator is operated in the leveling mode, the agitator levels the particulate material within the storage tank and/or within the hopper.

Additionally or alternatively, the controller is configured to determine whether a variation between the measured weight distribution and a target weight distribution is greater than a threshold variation. In response to the variation being greater than the threshold variation, the controller is configured to control the agitator to decrease the variation. For example, the controller may select the leveling operating mode to instruct a drive system coupled to the agitator to operate the agitator to level the particulate material within the storage tank and/or the hopper. In certain embodiments, the controller may select a direction of rotation of the agitator based on the measured weight distribution to move the particulate material from portion(s) of the storage tank and the hopper that contain more particulate material to portion(s) of the storage tank and the hopper that contain less particulate material.

Figure 1:
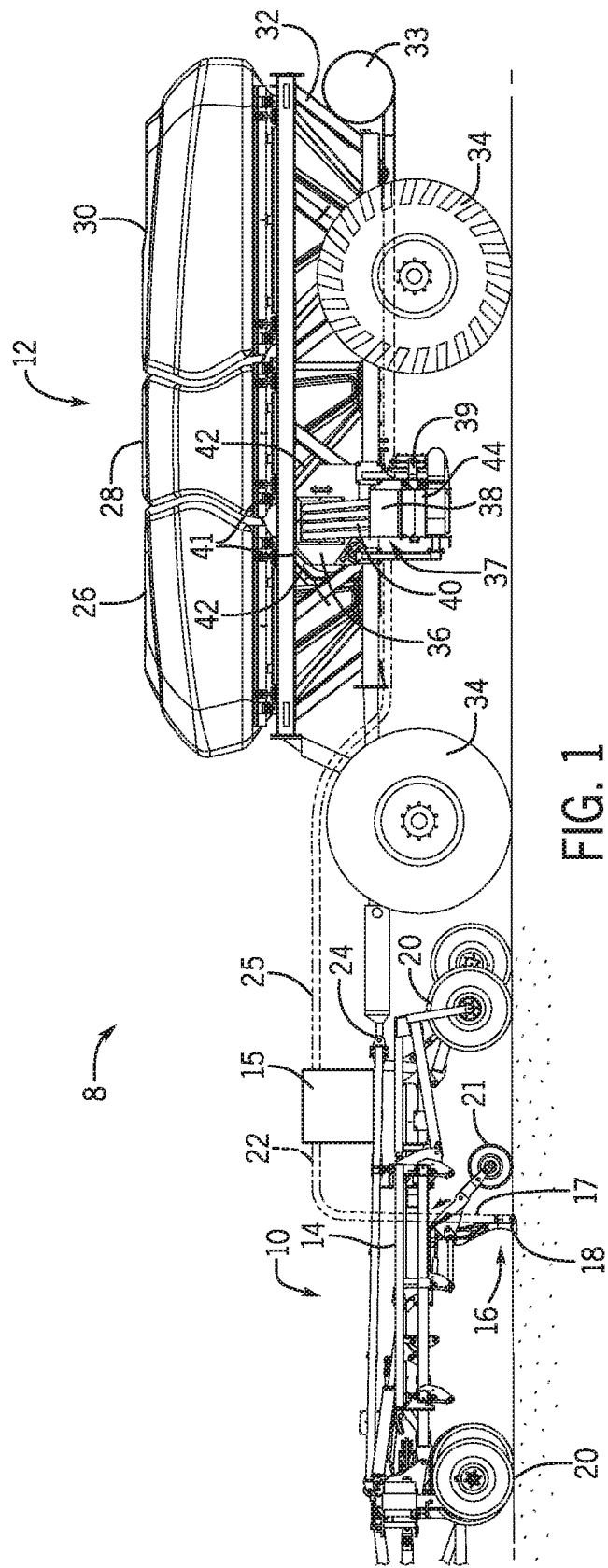
FIG. 1 is a side view of an embodiment of an agricultural implement coupled to an air cart, in accordance with an aspect of the present disclosure.

With the foregoing in mind, the present embodiments relating to particulate material agitation and leveling systems may be utilized within any suitable agricultural system. For example, FIG. 1 is a side view of an embodiment of an agricultural system 8 having an agricultural implement 10 coupled to an air cart 12. As depicted, the agricultural implement 10 includes a tool frame 14 coupled to a header 15, a row unit 16 having a particulate material tube 17 and an opener 18, and wheel assemblies 20. The agricultural implement 10 may be pulled by a work vehicle (e.g., a tractor) to deposit rows of particulate material (e.g., agricultural product) within the soil. Accordingly, the wheel assemblies 20 may contact the soil surface to enable the agricultural implement 10 to be pulled by the work vehicle. As the agricultural implement 10 is pulled, a row of the particulate material may be deposited in the soil by the row unit 16 (e.g., ground engaging opener assembly). Although only one row unit 16 is shown, the agricultural implement 10 may include multiple row units 16 (e.g., organized in a row across the agricultural implement 10). In some embodiments, the agricultural implement 10 may include a row of 12, 14, 16, 18, 20, or more row units 16, which may each deposit a respective row of particulate material into the soil.

To facilitate depositing the particulate material, each row unit 16 (e.g., ground engaging opener assembly) may include a press wheel 21. While the opener 18 engages the soil 23, the opener 18 exerts a force that excavates a trench into the soil 23 as the row unit 16 travels across the soil 23. The particulate material may be deposited into the excavated trench via the particulate material tube 17. Then, the press wheel 21 may pack soil onto the deposited particulate material. In certain embodiments, the press wheel may not directly be a part of the row unit. Instead, for example, at least one press wheel may be mounted to the frame of the implement behind the at least one row unit. Furthermore, while the illustrated row unit includes a ground engaging opener assembly, in alternative embodiments, at least one row unit on the implement may include an applicator assembly configured to deposit particulate material onto the surface of the field, or any other suitable type of product deposition assembly.

The header 15 may provide the particulate material to the row units 16. In some embodiments, the header 15 may pneumatically distribute the particulate material from a primary line to secondary lines. In the illustrated embodiment, a primary line 25 directs particulate material from the air cart 12 to the header 15. Additionally, the header 15 is configured to distribute the particulate material to the row units 16 via respective secondary lines 22. In certain embodiments, multiple primary lines may direct particulate material to multiple headers. Moreover, multiple secondary lines may extend from each header to respective row units. Furthermore, in certain embodiments, at least one secondary line may extend to a secondary header, and multiple tertiary lines may extend from the secondary header to respective row units.

In the illustrated embodiment, the air cart 12 is towed behind the agricultural implement 10. For example, the agricultural implement 10 may be coupled to the work vehicle by a first hitch assembly, and the air cart 12 may be coupled to the agricultural implement 10 by a second hitch assembly 24. However, in other embodiments, the agricultural implement may be towed behind the air cart. In further embodiments, the implement and the air cart may be part of a single unit that is towed behind the work vehicle or may be elements of a self-propelled vehicle.

The air cart 12 may centrally store particulate material and distribute the particulate material to the header 15. Accordingly, as depicted, the air cart 12 includes three primary storage tanks 26, 28, and 30, an air cart frame 32, an air source 33, and wheels 34. Further, the air cart 12 includes an auxiliary or secondary storage tank 36, a fill hopper 38, an air supply 39, and product conveyance conduits 40. The second hitch assembly 24 is coupled between the tool frame 14 and the air cart frame 32, which enables the air cart 12 to be towed with the agricultural implement 10. Further, the fill hopper 38 enables an operator to fill the secondary storage tank 36. Accordingly, the fill hopper 38 is located on a side of the air cart 12 and at a level above the soil that facilitates access by the operator (e.g., from ground level or from a bed of a truck).

Further, a particulate material agitation and leveling system 37 may be disposed in a storage tank or in a hopper coupled to the storage tank, and may be configured to agitate and/or level the particulate material in the storage tank and/or hopper. For example, the particulate material agitation and leveling system 37 may operate in an agitation mode and/or a leveling mode to agitate and/or level the particulate material in the storage tank and/or hopper. In certain embodiments, the hopper may be a bottom portion of the storage tank such that the particulate material agitation and leveling system may agitate and level the particulate material within the bottom portion of the storage tank. For purposes of discussion, this disclosure primarily refers to the particulate material agitation and leveling system 37 as being located in the secondary storage tank 36 to agitate and/or level the particulate material in the secondary storage tank 36. However, a particulate material agitation and leveling system may be located in one of the primary storage tanks 26, 28, 30 (e.g., in addition to or instead of the particulate material agitation and leveling system in the secondary storage tank) to agitate and/or level the particulate material in the primary storage tank(s).

The primary storage tanks 26, 28, and 30, and the secondary storage tank 36 may store the particulate material (e.g., seeds, granular fertilizer, granular inoculants, etc.). In some embodiments, the primary storage tanks 26, 28, and 30 may each include a single large storage compartment for storing a single agricultural product. In certain embodiments, the primary storage tanks may each store a different agricultural product. For example, the first primary storage tank 26 may store legume seeds, and the second primary storage tank 28 may store a dry fertilizer. Additionally, in this example, the secondary storage tank 36 may store granular inoculants, which are planted in conjunction with the legume seeds. In such configurations, the air cart 12 may deliver seed, fertilizer, and inoculant to the agricultural implement 10 via separate primary lines, or as a mixture through a single primary line.

Further, as illustrated, the secondary storage tank 36 is positioned beneath portions of the primary storage tanks 26 and 28. To improve storage capacity of the secondary storage tank 36, upper walls 41 of the secondary storage tank 36 have slopes that substantially correspond to respective slopes of bottom portions 42 of the primary storage tanks 26 and 28. Therefore, the shape of the secondary storage tank 36 enables the secondary storage tank 36 to utilize a substantial portion of the space between the primary storage tanks 26 and 28. Similarly, in an alternative embodiment, the secondary storage tank may be positioned between the primary storage tanks 28 and 30.

The particulate material may be fed from the secondary storage tank 36 into the particulate material agitation and leveling system 37 into the metering system 44, which meters the particulate material, fluidizes the particulate material via a fluidizing airflow from the air source 33, and distributes the particulate material to the header 15 via the primary line 25. In some embodiments, the air source 33 may be one or more pumps and/or blowers powered by electric or hydraulic motor(s), for example. The particulate material agitation and leveling system 37 may be positioned at the bottom of the secondary storage tank 36 and above the metering system 44, and may be configured to facilitate movement of the particulate material into the metering system 44 from the secondary storage tank 36. For example, the particulate material agitation and leveling system 37 may break up clumped sections of particulate material to enable the particulate material to flow to the metering system 44.

Figure 2:
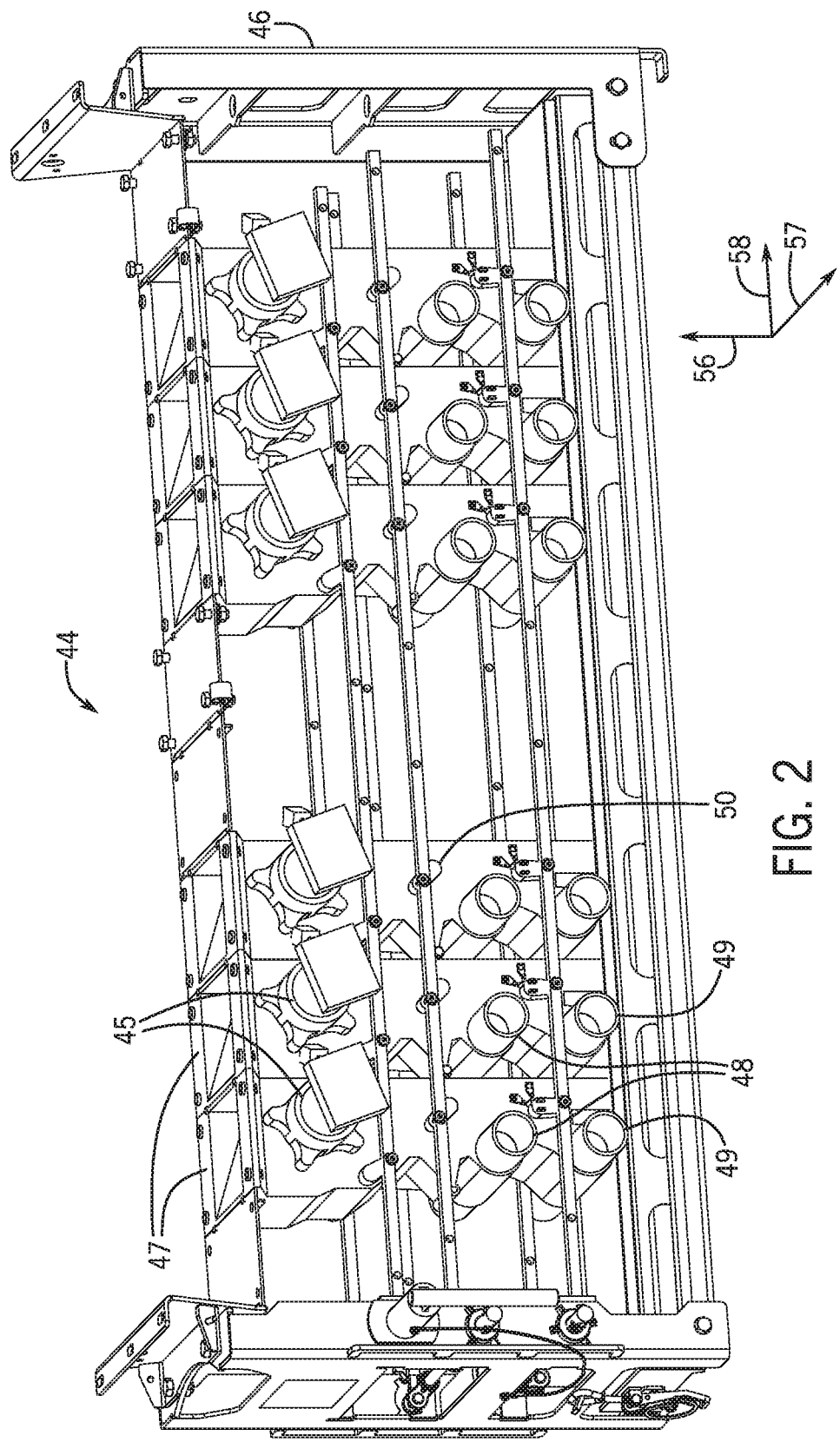
FIG. 2 is a perspective view of an embodiment of a metering system that may be employed within the air cart of FIG. 1, in accordance with an aspect of the present disclosure.

FIG. 2 is a perspective view of an embodiment of a metering system 44 that may be employed within the air cart of FIG. 1. As illustrated, the metering system 44 includes six material meters 45 (e.g., seed meters) supported by a frame 46. While the illustrated embodiment includes six material meters 45, more or fewer material meters may be employed in alternative embodiments. For example, certain metering systems may include 1, 2, 4, 6, 8, 10, 12, 14, or more material meters. In the illustrated embodiment, each material meter 45 includes at least one respective metering device (e.g., meter roller) to control flow of particulate material to a respective primary line. Each material meter 45 also includes an inlet 47 configured to receive the particulate material from a particulate material agitation and leveling system (e.g., along a vertical axis 56). Furthermore, each material meter 45 includes a first conduit connector 48 and a second conduit connector 49. Each conduit connector is configured to receive the air flow from the air source and the particulate material from the metering device, thereby producing an air/material mixture. First primary lines may be coupled to the first conduit connectors 48 and second primary lines may be coupled to the second conduit connectors 49. Furthermore, each material meter 45 includes a gate assembly 50 that enables selection of the first conduit connector 48 or second conduit connector 49. Once the first conduit connector 48 or the second conduit connector 49 is selected, particulate material flows through the selected conduit connector. As previously discussed, the primary lines may be coupled to respective distribution headers that provide the particulate material to multiple row units.

Figure 3:
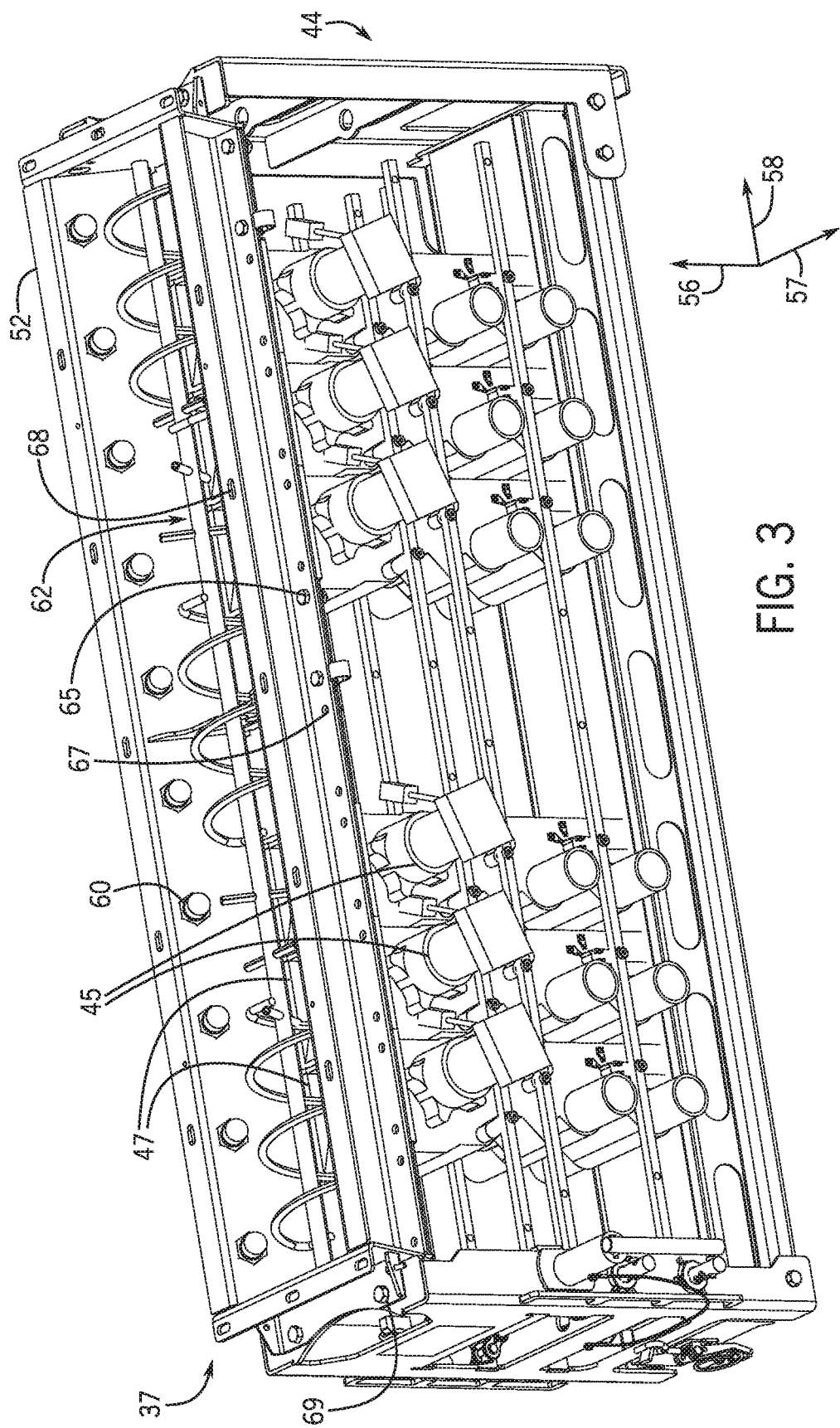
FIG. 3 is a perspective view of an embodiment of a particulate material agitation and leveling system and the metering system of FIG. 2, in accordance with an aspect of the present disclosure.

FIG. 3 is a perspective view of an embodiment of a hopper 52 and an agitator 62 of a particulate material agitation and leveling system 37 positioned adjacent to the metering system 44 of FIG. 2. The particulate material may flow down the storage tank to the metering system 44 via the particulate material agitation and leveling system 37. In the illustrated embodiment, the particulate material agitation and leveling system 37 includes sensors 60. In certain embodiments, some or all of the sensors 60 may be omitted from the particulate material agitation and leveling system 37. The particulate material agitation and leveling system 37 may be disposed within or below the storage tank and/or at least partially above the metering system 44. As shown, the particulate material agitation and leveling system 37 is disposed partially above the metering system 44 with respect to the vertical axis 56, such that the particulate material may flow from the particulate material agitation and leveling system 37 into the inlets 47 of the material meters 45. In some embodiments, the particulate material may pass through other features of the agricultural system (e.g., air cart) before entering the metering system 44.

In the illustrated embodiment, the particulate material agitation and leveling system 37 includes the hopper 52 secured to the frame 46 of the metering system 44 by fasteners 65, which are disposed through holes 67 and 69 of the hopper. First holes 67 are arranged along a length of the hopper 52 (e.g., along the longitudinal axis 58), and second holes 69 are arranged along a width of the hopper 52 (e.g., along the lateral axis 57). The hopper 52 also includes third holes 68 configured to receive fasteners for securing the hopper 52 to the storage tank or other portion of the agricultural system (e.g., air cart).

Figure 4:
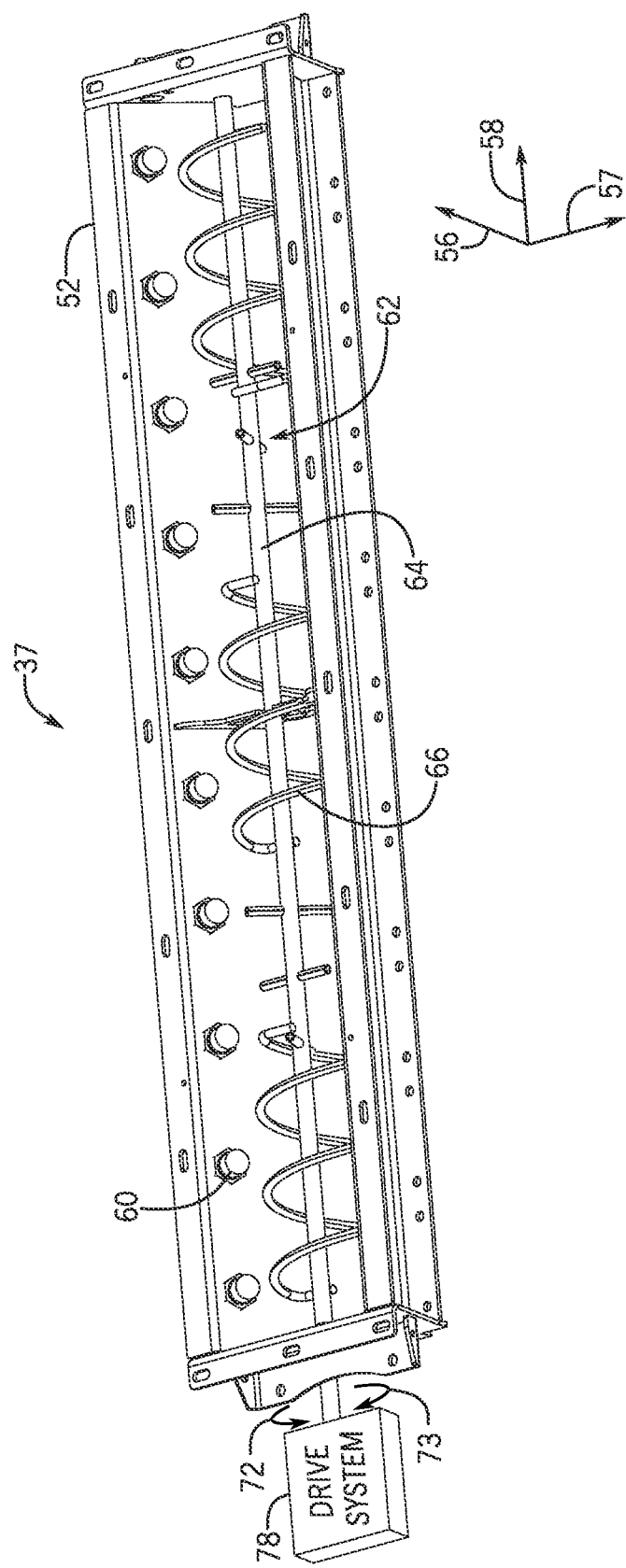
FIG. 4 is a top perspective view of the particulate material agitation and leveling system of FIG. 3, in accordance with an aspect of the present disclosure.

FIG. 4 is a top perspective view of the agitator 62 and a drive system 78 of the particulate material agitation and leveling system 37 of FIG. 3. As illustrated, the agitator 62 is disposed within the hopper 52 and extends along the longitudinal axis 58. The agitator 62 includes a shaft 64 coupled to the drive system 78 and a wrapped wire 66 coupled to the shaft 64. As illustrated, the wrapped wire 66 is a generally cylindrical coil wrapped around the shaft 64 (e.g., three wrapped coils coupled to the shaft 64 via radial bars). The particulate material may flow between the shaft 64 and the wrapped wire 66. In certain embodiments, the wrapped wire may be in a conical form, a helical form, and or another suitable form configured to enable the particulate material to pass through the agitator 62. In the illustrated embodiment, the agitator 62 may rotate in a first direction 72 and in a second direction 73 (e.g., a direction opposite the first direction) to move the particulate material within the hopper 52 and/or within the storage tank (e.g., to agitate and/or to level the particulate material). In certain embodiments, other types of agitators may be used in the particulate material agitation and leveling system (e.g., an agitator that moves linearly in the hopper to move the particulate material). In some embodiments, the agitator may be mounted higher in the storage tank relative to the hopper. For example, the agitator may be disposed above the hopper.

As the particulate material rests in the storage tank, the particulate material may clump together to form pieces that are larger than desired (e.g., larger than inlets of the material meters). When the particulate material flows through the agitator 62 and while the agitator 62 is operating, the clumps of particulate material break into smaller pieces more suitable for flowing through the metering system 44. For example, the agitator 62 may rotate to agitate the particulate material, thereby breaking up the clumps. Additionally or alternatively, as the particulate material is dispensed from the storage tank, the particulate material may become unevenly distributed and/or may form an undesirable profile within the storage tank. Rotation of the agitator 62 may level the particulate material to form the desired profile within the storage tank.

As described herein, the drive system 78 may operate the agitator 62 in certain operating modes (e.g., the agitation mode and the leveling mode). In the agitation mode, the agitator 62 may rotate in the first direction 72 and in the second direction 73 to agitate the particulate material, thereby reducing clumping of the particulate material within the storage tank and/or within the hopper 52. For example, the drive system 78 may rotate the agitator 62 in the first direction 72 for a first period of time and in the second direction 73 for a second period of time. The first period of time and/or the second period of time may be any duration generally between one second and five minutes. In the leveling mode, the drive system 78 may rotate the agitator 62 in the first direction 72 and/or in the second direction 73 to move the particulate material toward the first end 74 of the hopper 52 and the area of the storage tank generally above the first end 74, toward the second end 75 of the hopper 52 and the area of the storage tank generally above the second end 75, toward a center of the hopper 52, outwardly to both the first end 74 and the second end 75, toward other portions of the storage tank and/or of the hopper 52, or a combination thereof. For example, the drive system 78 may rotate the agitator 62 to move the particulate material toward a portion of the storage tank 36 and/or of the hopper 52 that contains less particulate material than other portion(s), thereby leveling the particulate material along the longitudinal axis 58. In the leveling mode, the drive system 78 may rotate the agitator 62 in the first direction 72 and/or in the second direction 73 for any suitable period of time generally between one second and five minutes.

In certain embodiments, the agitator 62 may operate in the agitation mode about eighty percent of the time that the agitator 62 is operating and may operate in the leveling mode about twenty percent of the time that the agitator 62 is operating. In other embodiments, the agitator 62 may operate in the agitation mode and/or in the leveling mode other suitable percentages of the time that the agitator 62 is operating.

In certain embodiments, the leveling mode of the agitator 62 may generally utilize more power compared to the agitation mode, because the drive system 78 may rotate the agitator 62 for a longer duration in the leveling mode compared to the agitation mode. In other embodiments, the agitation mode may generally utilize more power compared to the leveling mode due to the type of particulate material, a size of the storage tank and/or the hopper, an amount of the particulate material within the storage tank and/or the hopper, and other factors. As described in greater detail below, the controller of the particulate material agitation and leveling system 37 is configured to control the agitator 62 to operate in the agitation mode or the leveling mode based on the amount and/or the distribution of the particulate material within the storage tank and/or within the hopper 52 (e.g., the measured weight of the particulate material as sensed by sensors of the particulate material agitation and leveling system 37 and/or as determined by the controller). For example, the controller may instruct the drive system 78 to operate the agitator 62 in the leveling mode only when leveling of the particulate material is beneficial, and in the agitation mode for a remainder of the time that the agricultural implement is operating and/or that the particulate material is flowing through the metering system. As such, the particulate material agitation and leveling system 37 may enhance an efficiency of the agitator 62 and the agricultural implement generally (e.g., may reduce a duty cycle of the drive system 78 and/or may enable the agitator 62 to use less power) by selecting the operating mode based on certain factors (e.g., based on the measured weight).

In certain embodiments, the agitator 62 may operate in the agitation mode and in the leveling mode, and the leveling mode may include multiple sub-modes. Each of the agitation mode and the sub-modes of the leveling mode may involve operating the agitator 62 at different intensities. For example, in the agitation mode, the agitator 62 may be driven to rotate in the first direction for a relatively low amount of time (e.g., active time), remain stationary for a relatively high amount of time (e.g., a dwell time), and driven to rotate in the second direction for a relatively low amount of time (e.g., active time). In a light leveling sub-mode, the agitator 62 may lightly level the particulate material within the storage tank and/or the hopper. In the light leveling sub-mode, the agitator 62 may be driven to rotate in the first direction for a relatively high amount of time (e.g., higher than the active time of the agitation mode), remain stationary for a relatively low amount of time (e.g., lower than the dwell time of the agitation mode), and rotate in the second direction for a relatively high amount of time (e.g., higher than the active time of the agitation mode). In a moderate leveling sub-mode, the agitator 62 may be driven to rotate in the first direction for a relatively high amount of time (e.g., a higher amount of time than the light leveling sub-mode), remain stationary for a relatively low amount of time (e.g., a lower amount of time than the light leveling sub-mode), and driven to rotate in the second direction for a relatively high amount of time (e.g., a higher amount of time than the light leveling sub-mode). In a heavy leveling sub-mode, the agitator 62 may be driven to rotate in the first direction for a relatively high amount of time (e.g., a higher amount of time than the moderate leveling sub-mode), remain stationary for a relatively low amount of time (e.g., a lower amount of time than the moderate leveling sub-mode), and driven to rotate in the second direction for a relatively high amount of time (e.g., a higher amount of time than the moderate leveling sub-mode). In some embodiments, the agitator 62 may be driven to rotate in the first direction for a longer period of time than in the second direction, or in the second direction for a longer period of time than in the first direction, to provide asymmetrical leveling of the particulate material within the storage tank and/or the hopper 52 (e.g., to move the particulate material toward an end of the storage tank and/or the hopper 52). The amount of time that the agitator 62 is driven to operate in the first direction and/or in the second direction may vary depending on the operating mode and may be any suitable amount of time (e.g., five seconds, ten seconds, fifteen seconds, twenty seconds, thirty seconds, one minutes, five minutes, or any other suitable time period). As described in greater detail below, a controller of the particulate material agitation and leveling system 37 may be configured to operate the agitator 62 in the agitation mode or in the leveling mode (e.g., in the light leveling sub-mode, in the moderate leveling sub-mode, or in the heavy leveling sub-mode).

The drive system 78 of the particulate material agitation and leveling system 37 is configured to drive the agitator 62 to rotate. The drive system 78 may include a motor configured to drive the agitator 62 to rotate (e.g., an electric motor, hydraulic motor, etc.). In the illustrated embodiment, the drive system 78 includes a single motor disposed at an end of the hopper 52; however, the drive system may include more than one motor (e.g., 2, 3, 4, 5, etc.). For example, the drive system may include a motor disposed at each end of the hopper. The drive system may also include motor(s) disposed along the length of the hopper. Motor(s) disposed along the length of the hopper may be connected to respective agitators and may be configured to drive the respective agitators to rotate.

In the illustrated embodiment, the particulate material agitation and leveling system 37 includes a single agitator 62. In certain embodiments, multiple agitators (e.g., 2, 3, 4, 5, 6, 7, 8, etc.) may be disposed in the hopper 52 and/or the storage tank. The agitators may be disposed in series or in parallel. In a configuration with more than one agitator, drive system(s) may drive respective agitators to move the particulate material in one or more directions. For example, the particulate material agitation and leveling system may include multiple drive systems (e.g., 2, 3, 4, 5, 6, 7, 8, etc.) with each drive system coupled to and configured to rotate a respective agitator. Agitators may also be disposed at different levels in the hopper and/or storage tank. For example, one or more agitator(s) may be disposed in the hopper, and/or one or more agitator(s) may be disposed higher in the storage tank.

FIG. 5 is a block diagram of an embodiment of the storage tank 36 coupled to the particulate material agitation and leveling system 37 from a top perspective. During operation, particulate material may flow from the storage tank 36, through the agitator 62 (e.g., through the hopper 52 in which the agitator 62 is disposed), and to the metering system. The drive system 78 (e.g., the motor of the drive system 78) may drive rotation of the agitator 62 to agitate and/or to level the particulate material within the storage tank 36 and/or within the hopper 52. The particulate material may flow from the storage tank 36 to the metering system as the agitator 62 rotates.

As the storage tank 36 and the hopper 52 are filled with particulate material (e.g., prior to a seeding operation) and/or while the particulate material is dispensed from the storage tank 36 and the hopper 52 (e.g., during the seeding operation), an amount and weight of the particulate material within the storage tank 36 and/or the hopper 52 may change. Additionally or alternatively, a weight distribution of the particulate material within the storage tank 36 and/or the hopper 52 may change. For example, more particulate material may be disposed at a first end 80 of the storage tank 36 and the hopper 52 compared to a second end 82 of the storage tank 36 and the hopper 52, or vice versa. In certain embodiments, more particulate material may be disposed at a middle portion 84 of the storage tank 36 and/or the hopper 52 compared to the first end 80 and/or the second end 82.

As illustrated, the particulate material agitation and leveling system 37 includes sensors 86 configured to output signal(s) indicative of a measured weight of the particulate material within the storage tank 36 and the hopper 52. For example, as explained in greater detail below, the sensors 86 are positioned generally between the storage tank 36 and a chassis 87 of the agricultural system (e.g., air cart). The sensors 86 are configured to output signal(s) indicative of a weight of the storage tank 36 and the hopper 52 and of the particulate material within the storage tank 36 and the hopper 52. The sensors 86 may include strain gauges, load cells, other sensors configured to detect a weight, or a combination thereof. As such, the sensors 86 may output signal(s) (e.g., sensor signal(s)) indicative of the measured weight of the particulate material within the storage tank 36 and the hopper 52.

The sensors 86 include a sensor 86A (e.g., a scale A), a sensor 86B (e.g., a scale B), a sensor 86C (e.g., a scale C), and a sensor 86D (e.g., a scale D) positioned generally at respective corners of the storage tank 36. Further, the sensors 86A and 86B form a first sensor group 89A, and the sensors 86C and 86D form a second sensor group 89B. In certain embodiments, the first sensor group 89A and/or the second sensor group 89B may include more or fewer sensors 86 (e.g., one sensor 86, three sensors 86, four sensors 86). Additionally, as illustrated, the first sensor group 89A is positioned adjacent the first end 80 of the storage tank 36 and the hopper 52, and the second sensor group 89B is positioned adjacent the second end 82 of the storage tank 36 and the hopper 52. In certain embodiments, the first sensor group and/or the second sensor group may be positioned along other suitable side(s) of the storage tank/hoppers and/or along other portion(s) of the storage tank/hopper. The first sensor group 89A may detect the weight of the particulate material generally at the first end 80, and the second sensor group 89B may detect the weight of the particulate material generally at the second end 82. As such, the sensors 86 are configured to output signals indicative of the weight of the particulate material within the storage tank 36 and the hopper 52 at specific locations of the storage tank 36 and the hopper 52. Based on the signal(s) indicative of the weights received from the sensors 86, along with their respective locations, the particulate material agitation and leveling system 37 is configured to determine a weight distribution and/or a total weight of the particulate material.

In certain embodiments, the particulate material may be distributed within the storage tank 36 and/or the hopper 52 such that a first amount of the particulate material at the first end 80 is generally the same as a second amount of the particulate material at the second end 82 and generally different from a third amount of the particulate material at the middle portion 84. The particulate material agitation and leveling system 37 includes a sensor 88 positioned at the middle portion 84 and configured to output a signal indicative of a level of the particulate material within the storage tank 36 and/or the hopper 52 at the middle portion 84.

The signals output by the sensors 86 indicative of the measured weight of the particulate material within the storage tank 36 and/or the hopper 52 may be received by a controller 90 of the particulate material agitation and leveling system 37. Additionally, the signal output by the sensor 88 indicative of the level of the particulate material within the storage tank 36/hopper 52 at the middle portion 84 may be received by the controller 90. Based on the measured weight of the particulate material, the level of the particulate material, or both, the controller 90 may determine a general level of the particulate material, a profile of the particulate material, an amount of the particulate material, a weight distribution of the particulate material, or a combination thereof, within the storage tank 36 and/or the hopper 52. The controller 90 may also select the operating mode of the agitator 62 (e.g., the agitation mode or the leveling mode) based on the measured weight of the particulate material, the level of the particulate material, the profile of the particulate material, the amount of the particulate material, the weight distribution of the particulate material, or a combination thereof. For example, the controller 90 may select the agitation mode in response to determining that the measured weight of the particulate material is relatively high. Additionally, the controller 90 may select the leveling mode in response to determining that the weight of the particulate material is relatively low. Further, the controller 90 may select a direction of rotation of the agitator 62 while operating in the leveling mode based on the weight distribution of the particulate material and a target weight distribution.

In certain embodiments, the controller 90 is configured to select the operating mode by comparing the measured weight to a threshold weight. The threshold weight may indicate the point at which the agitator 62 may transition between the agitation mode and the leveling mode. For example, a measured weight greater than the threshold weight may indicate that the general level of the particulate material within the storage tank 36 is above a certain level (e.g., a threshold level). As such, when the measured weight is greater than the threshold weight, the particulate material may be agitated to promote efficient flow of the particulate material from the storage tank 36, through the hopper 52, and to the metering system (e.g., by breaking up clumps within the particulate material). If the measured weight is generally equal to or below the threshold weight, the measured weight may indicate that the general level of the particulate material within the storage tank 36 and/or within the hopper 52 is relatively low. As such, when the measured weight is less than or equal to the threshold weight, the particulate material may be leveled to promote efficient and generally equal flow of the particulate material from the storage tank 36 and the hopper 52 to the seed meters of the metering system. In certain embodiments, the controller 90 may select the light leveling mode, the moderate leveling mode, or the heavy leveling mode based on the measured weight and the threshold weight.

In certain embodiments, the controller 90 may determine the threshold weight based on an initial measured weight of the particulate material within the storage tank 36 and/or the hopper 52. For example, at the beginning of a seeding operation and/or upon receiving a user input indicative of instructions to determine the threshold weight, the controller 90 may determine the initial measured weight of the particulate material based on the sensor signal(s) and may determine the threshold weight based on the initial measured weight. The threshold weight may be a percentage of the initial measured weight (e.g., ten percent, twenty percent, twenty-five percent, forty percent, fifty percent, sixty percent, etc.).

In embodiments, the controller 90 may determine multiple threshold weights and operate the agitator 62 based on comparisons of the measured weight to the multiple threshold weights. For example, based on the measured weight exceeding or being equal to a first threshold weight greater than a second threshold weight, the controller 90 may operate the agitator 62 in the agitation mode. Based on the measured weight being less than the first threshold weight and greater than the second threshold weight, the controller may operate the agitator in the agitation mode and/or in the leveling mode. Based on the measured weight being less than or equal to the second threshold weight, the controller 90 may operate the agitator in the leveling mode or in a sub-mode of the leveling mode (e.g., the light leveling sub-mode, the moderate leveling sub-mode, or the heavy leveling sub-mode).

As described above, the controller 90 may receive sensor signal(s) from the sensors 86 indicative of the measured weight of the particulate material within the storage tank 36 and/or the hopper 52. The controller 90 may determine the measured weight distribution based on the signals received from the sensors 86 indicative of the measured weights of the particulate material and the respective locations of the sensors 86. As illustrated, each sensor 86 is disposed generally at a corner of the storage tank 36. As such, the controller 90 may determine the weight of the particulate material within the storage tank 36/hopper 52 (e.g., at the first end 80, at the second end 82, and/or at other locations) and the weight distribution generally. In certain embodiments, the controller 90 may determine the measured weight distribution based on signals received from the sensor 88 indicative of the level of the particulate material within the storage tank 36/hopper 52 at the middle portion 84 (e.g., in conjunction with the signals received from the sensors 86 indicative of the measured weights). The measured weight distribution may be a distribution along the lateral axis 57 and/or along the longitudinal axis 58.

The controller 90 may control the agitator 62 based on the measured weight distribution and a target weight distribution. For example, the controller 90 may determine whether a variation between the measured weight distribution and the target weight distribution is greater than a threshold variation. In certain embodiments, the target weight distribution may include a first percentage of a total weight at the first end 80, a second percentage of the total weight at the second end 82, and other percentages of the total weight along other portions of the storage tank 36 and/or the hopper 52. In other embodiments, the target weight distribution may include numerical weight values along portions of the storage tank 36 and/or the hopper 52 (e.g., at the first end 80 and at the second end 82). The threshold variation is a difference between the measured weight distribution and the target weight distribution that may trigger control of the agitator 62 by the controller 90. For example, exceeding the variation may cause the particulate material agitation and leveling system 37 to switch between operating modes (e.g., the agitating, the leveling mode, and the leveling sub-modes). In some embodiments, the target weight distribution and/or the threshold variation may be automatically determined by the controller 90 and/or may be received via operator input. For example, the target weight distribution and/or the threshold variation may be determined based on the initial measured weight, an initial measured weight distribution, operator input(s), a type of particulate material, a size of the storage tank and/or of the hopper, an expected and/or desired flow of the particulate material through the metering system and/or each seed meter of the metering system, or a combination thereof.

In response to the variation between the measured weight distribution and the target weight distribution being greater than the threshold variation, the controller 90 may select the operating mode of the agitator 62 (e.g., the agitation mode or the leveling mode). In certain embodiments, the controller 90 may select a sub-mode of the leveling mode (e.g., the light leveling sub-mode, the moderate leveling sub-mode, or the heavy leveling sub-mode), as described herein. The controller 90 may instruct the drive system 78 to operate the agitator 62 based on the selected operating mode.

In certain embodiments, the controller 90 may select a direction of rotation of the agitator 62 based on the variation between the measured weight distribution and the target weight distribution. For example, the controller 90 may, in response to determining that the variation between the measured weight distribution and the target weight distribution is greater than the threshold variation, determine that more particulate material is disposed generally at the first end 80 and/or at the second end 82, as compared to an opposite end and/or other portions of the storage tank 36 and the hopper 52. The controller 90 may control the agitator 62 to level the particulate material to cause the variation to decrease below the threshold variation (e.g., to generally level the particulate material within the storage tank 36 and the hopper 52). For example, in response to determining that more particulate material is disposed at the first end 80 of the storage tank 36 and/or the hopper 52, as compared to the second end 82 of the storage tank 36 and/or the hopper 52, and that the variation between the measured weight distribution and the target weight distribution is greater than the threshold variation, the controller 90 may operate the drive system 78 such that the agitator 62 moves the particulate material generally from the first end 80 toward the second end 82. In response to determining that more particulate material is disposed at the second end 82 of the storage tank 36 and/or the hopper 52, as compared to the first end 80 of the storage tank 36 and/or the hopper 52, and that the variation between the measured weight distribution and the target weight distribution is greater than the threshold variation, the controller 90 may operate the drive system 78 such that the agitator 62 moves the particulate material generally from the second end 82 toward the first end 80. Additionally, the controller 90 may operate the drive system 78 in a suitable operating mode of the agitation mode, the light leveling sub-mode, the moderate leveling sub-mode, and the heavy leveling sub-mode such that the agitator 62 moves the particulate material within the storage tank 36 and/or the hopper 52 to decrease the variation between the measured weight distribution and the target weight distribution to be less than the threshold variation. As such, the controller 90 may control operation of the drive system 78 and the agitator 62 to move the particulate material toward the first end 80 and/or the second end 82 and to provide to provide asymmetrical leveling of the particulate material within the storage tank 36 and/or the hopper 52.

As illustrated, the controller 90 of the particulate material agitation and leveling system 37 includes a processor 92 and a memory 94. The processor 92 (e.g., a microprocessor) may be used to execute software, such as software stored in the memory 94 for controlling the drive system 78. Moreover, the processor 92 may include multiple microprocessors, one or more "general-purpose" microprocessors, one or more special-purpose microprocessors, and/or one or more application specific integrated circuits (ASICS), or some combination thereof. For example, the processor 92 may include one or more reduced instruction set (RISC) or complex instruction set (CISC) processors.

The memory device 94 may include a volatile memory, such as random access memory (RAM), and/or a nonvolatile memory, such as read-only memory (ROM). The memory device 94 may store a variety of information and may be used for various purposes. For example, the memory device 94 may store processor-executable instructions (e.g., firmware or software) for the processor 92 to execute, such as instructions for controlling the drive system 78. In certain embodiments, the controller 90 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., the threshold weights and/or the threshold variations), instructions (e.g., software or firmware for controlling the drive system 78), and any other suitable data. The processor 92 and/or the memory device 94, and/or an additional processor and/or memory device, may be located in any suitable portion of the system. For example, a memory device for storing instructions (e.g., software or firmware for controlling the drive system 78) may be located in or associated with the drive system 78.

Additionally, the controller 90 includes a user interface 96 configured to inform an operator of the operating mode of the agitator 62, to provide the operator with selectable options of the particulate material agitation and leveling system 37, to inform the operator of the measured weight and/or the measured weight distribution of the particulate material within the storage tank 36 and/or the hopper 52, and to enable other operator interactions. The user interface 96 may include a display and/or user interaction device(s). For example, the display may present information to the operator, such as selectable options of the operating mode, information related to the operating mode selected by the controller 90, a graphical representation of the weight/level of the particulate material within the storage tank 36 and/or within the hopper 52, the weight distribution of the particulate material within the storage tank 36 and/or within the hopper 52, or a combination thereof. The user interaction devices may include button(s) and/or input device(s) that enable interaction with the particulate material agitation and leveling system 37. For example, based on the weight/level of the particulate material displayed by the display of the user interface 96, the operator may select the operating mode via the display (e.g., in embodiments in which the display is a touch screen) and/or via the user interaction devices. In certain embodiments, the controller 90 of the particulate material agitation and leveling system 37 may select the operating mode in addition to, or independent of, the operator interaction via the user interface 96.

FIG. 6 is a block diagram of an embodiment of the storage tank 36 with particulate material 100 disposed therein and coupled to the particulate material agitation and leveling system 37 of FIG. 5 from a side perspective. The sensors 86 may output signals indicative of the weight of the particulate material 100 within the storage tank 36 and/or the hopper 52. For example, the sensors 86 of the first sensor group 89A may output signals indicative of the weight of the particulate material 100 generally adjacent to the first end 80 and the middle portion 84. The sensors 86 of the second sensor group 89B may output signals indicative of the weight of the particulate material 100 generally adjacent to the second end 82 and the middle portion 84. As described above, the controller 90 may receive the signals indicative of the measured weights, may select an operating mode based on the measured weight (e.g., may select an operating mode based on a comparison between the measured weight and the threshold weight), and may control the agitator 62 (e.g., operate the drive system 78 to control the agitator 62) based on the operating mode.

In certain embodiments, the controller 90 may receive signals indicative of the respective measured weights of the particulate material 100 within the storage tank 36 and/or the hopper 52 from the sensors 86 and may determine the measured weight distribution based on the measured weights. As illustrated, the particulate material 100 is distributed generally unevenly within the storage tank 36 and the hopper 52. As such, the controller 90 may determine that the measured weight distribution generally includes more particulate material at the first end 80, as compared to the second end 82. The controller 90 may compare the measured weight distribution to the target weight distribution and, in response to the variation between the measured weight distribution and the target weight distribution being greater than the threshold variation, may change the operating mode of the agitator 62 and/or may select the direction of rotation of the agitator 62. For example, in the illustrated embodiment, the controller 90 may determine that the variation between the measured weight distribution and the target weight distribution is greater than the threshold variation. Additionally, the controller 90 may determine that the measured weight is generally greater at the first end 80 than the second end 82. As such, the controller 90 may operate the agitator 62 to move the particulate material 100 generally from the first end 80 toward the second end 82. In other embodiments, the controller 90 may determine that the measured weight is generally greater at the second end 82 than the first end 80, and may operate the agitator 62 to move the particulate material 100 generally from the second end 82 toward the first end 80.

As illustrated, the sensors 86 are positioned between storage tank mounts 102, which are coupled to the storage tank 36, and chassis mounts 104, which are coupled to the chassis 87. As such, the sensors 86 are configured to output signals indicative of the measured weight of the storage tank 36 and/or the hopper 52 and the particulate material 100 disposed therein. In certain embodiments, some or all of the sensors may positioned in different location(s) along the storage tank and/or the chassis. In some embodiments, the particulate material agitation and leveling system may include more or fewer sensors configured to output signals indicative of the measured weight of the storage tank and/or the hopper and the particulate material disposed therein.

FIG. 7 is a block diagram of an embodiment of the storage tank 36 with the particulate material 100 disposed therein and coupled to the particulate material agitation and leveling system 37 of FIG. 5 from a side perspective. As illustrated, the particulate material 100 is generally level within the storage tank 36 and the hopper 52. As such, the controller 90 may determine that the variation between the measured weight distribution of the particulate material 100 and the target weight distribution is less than the threshold variation. For example, FIG. 7 may show the particulate material 100 after the agitator 62 leveled the particulate material 100. In certain embodiments, the controller 90 may instruct the drive system 78 to operate in the agitation mode to agitate the particulate material 100 of FIG. 7.

FIG. 8 is a flow diagram of an embodiment of a process 110 for controlling the particulate material agitation and leveling system. For example, the process 110, or portions thereof, may be performed by the controller of the particulate material agitation and leveling system and/or by another suitable controller. The process 110 begins at block 112, in which operating parameter inputs are received. The operating parameter inputs may include the type of the particulate material, a speed of the agricultural system through the field, a speed of meter roller(s) configured to meter the particulate material, a size and/or model of the storage tank and/or of the agricultural system, weather conditions, soil conditions, a flow rate of the particulate material from the storage tank, or a combination thereof. The operating parameter inputs may be received via the user interface of the particulate material agitation and leveling system, may be stored in the memory of the controller, may be received via sensors of the agricultural implement, may be received from a transceiver, or a combination thereof.

At block 114, measured weight(s) of the particulate material within the storage tank and/or the hopper is received. For example, the sensors of the particulate material agitation and leveling system may output signals indicative of the measured weights, and the signals may be received by the controller.

After receiving the measured weights, the process 110 may proceed to blocks 116-122 and/or to blocks 124-130. At block 116, the controller determines a total measured weight of the particulate material based on the measured weights (e.g., based on the signals indicative of the measured weights). In some embodiments, the controller may account for a weight of the storage tank, the hopper, other portions of the agricultural implement, or a combination thereof, when determining the total weight of the particulate material (e.g., the controller may subtract the weight of the components of the agricultural implement from the total weight to determine the total weight of the particulate material).

At block 118, a threshold weight is established. For example, at the start of a seeding operation, the controller may determine the threshold weight as a percentage of the total measured weight (e.g., ten percent, twenty percent, twenty-five percent, forty percent, fifty percent, sixty percent, etc.) determined at block 116. In certain embodiments, the threshold weight may be a numerical value (e.g., fifty kilograms (kg), one hundred kg, two hundred kg, etc.). In further embodiments, the threshold weight may be determined by the controller based on the type of particulate material, the size of the storage tank and/or the hopper, and other factors. Furthermore, in certain embodiments, the threshold weight may be received via operator input.

At block 120, an operating mode is selected from the agitation mode and the leveling mode. In some embodiments, the operating mode may be selected based on a comparison of the measured weight to the threshold weight.

At block 122, the agitator is operated based on the operating mode (e.g., the controller, via the processor, may output control signals to the drive system based on the operating mode, and the drive system may operate the agitator based on the control signals). For example, in response to selection of the agitation mode, the controller may output control signals to the drive system indicative of instructions to operate the agitator in the agitation mode. In response to selection of the leveling mode, the controller may output control signals to the drive system indicative of instructions to operate the agitator in the leveling mode. Further, in response to selection of a sub-mode of the leveling mode (e.g., the light leveling sub-mode, the moderate leveling sub-mode, or the heavy leveling sub-mode), the controller may output control signals to the drive system indicative of instructions to operate the agitator in the selected leveling sub-mode.

After completing block 122, the process 110 returns to block 114 and receives the next signals indicative of the measured weights of the particulate material within the storage tank and/or the hopper. The next operating mode may be selected (e.g., the block 120), which may be the same operating mode or a different operating mode as compared to the previous operating mode. As such, blocks 114-122 of the process 110 may be iteratively performed by the controller of the particulate material agitation and leveling system to agitate and/or to level the particulate material within the storage tank and/or within the hopper.

As described above, the process 110 may proceed to blocks 124-130 after receiving the measured weight of particulate material (e.g., block 114). At block 124, the controller determines the measured weight distribution of the particulate material based on the measured weights (e.g., based on the signals indicative of the measured weights) and the respective locations of the sensors. In some embodiments, the controller may account for a weight distribution of the storage tank, the hopper, other portions of the agricultural implement, or a combination thereof, when determining the measured weight distribution of the particulate material.

At block 126, a target weight distribution is established. For example, the target weight distribution may be automatically determined by the controller based on the measured weight, the type of particulate material, the size of the storage tank and/or the hopper, the expected flow rate of the particulate material through each seed meter of the metering system, and other factors, and/or may be received via operator input.

At block 128, the controller of the particulate material agitation and leveling system determines whether a variation between the measured weight distribution and the target weight distribution exceeds a threshold variation. The threshold variation may be automatically determined by the controller based on the measured weight, the type of particulate material, the size of the storage tank and/or the hopper, and other factors, and/or may be received via operator input.

In response to determining that the variation between the measured weight distribution and the target weight distribution exceeds the threshold variation, the controller selects the operating mode and/or selects a direction of rotation of the agitator at block 130. The controller may select the operating mode from the agitation mode, the leveling mode, and a sub-mode of the leveling mode. The direction of rotation may depend on how the particulate material is distributed within the storage tank and/or the hopper. For example, if more particulate material is disposed at a first end of the storage tank and/or the hopper, as compared to a second end of the storage tank and/or the hopper, the controller may operate the agitator such that the particulate material is moved generally from the first end and toward the second end. The controller controls the agitator based on the selected operating mode. As such, the controller may control the agitator to decrease the variation between the measured weight distribution and the target weight distribution, thereby providing each seed meter of the metering system with a supply of the particulate material.

After completing block 130, the process 110 returns to block 114 and receives the next signals indicative of the measured weights of the particulate material within the storage tank and/or the hopper. The next measured weight distribution is determined (e.g., block 124) and is compared to the target weight distribution (e.g., block 128). The next operating mode and/or direction of rotation of the agitator is selected based on the comparison (e.g., block 130). As such, blocks 114 and 124-130 of the process 110 may be iteratively performed by the controller of the particulate material agitation and leveling system to agitate and/or to level the particulate material within the storage tank and/or within the hopper.

The particulate material agitation and leveling system described herein may enable efficient operation of an agitator. For example, the controller of the particulate material agitation and leveling system may receive signals indicative of a measured weights of the particulate material within the storage tank and/or the hopper of the agricultural system. Based on the measured weight (e.g., based on a comparison of the measured weight to a threshold weight), the controller may select an operating mode of the agitator from an agitation mode and a leveling mode, and may operate the agitator based on the selected operating mode. Additionally or alternatively, the controller may determine the measured weight distribution based on the measured weights. Based on a variation between the measured weight distribution and a target weight distribution exceeding the threshold variation, the controller may operate the agitator in the leveling mode and/or may rotate the agitator in a specific direction to decrease the variation between the measured weight distribution and the target weight distribution.

Selection of the operating mode and/or the rotational direction by the particulate material agitation and leveling system may facilitate efficient control of the agitator. For example, the drive system may utilize less power via selection of an effective operating mode. Additionally, the duty cycle of the drive system may be reduced, thereby extending a working life of the drive system. As such, the power utilized by the agitator may be reduced while providing effective agitation and leveling. Thus, the particulate material agitation and leveling system may improve an operational and a general efficiency of the agricultural system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A particulate material agitation and leveling system, comprising:
a controller comprising a memory and a processor, wherein the controller is configured to:
receive at least one sensor signal indicative of a measured weight distribution of a particulate material within a storage tank of an agricultural system;
determine whether a determined variation between the measured weight distribution and a target weight distribution is greater than a threshold variation; and
control an agitator to decrease the determined variation in response to determining that the determined variation is greater than the threshold variation, wherein the agitator is configured to be positioned between the storage tank and a metering system of the agricultural system along a vertical axis of the agricultural system.

2. The particulate material agitation and leveling system of claim 1, wherein the at least one sensor signal indicative of the measured weight distribution comprises a plurality of signals indicative of measured weights, wherein the controller is configured to determine the measured weight distribution based on the plurality of signals indicative of the measured weights and respective locations of a plurality of sensors configured to output the plurality of signals indicative of the measured weights.

3. The particulate material agitation and leveling system of claim 2, comprising the plurality of sensors configured to output the plurality of signals indicative of the measured weights of the particulate material within the storage tank.

4. The particulate material agitation and leveling system of claim 2, wherein each sensor of the plurality of sensors is configured to measure a weight of the particulate material at a location along the storage tank.

5. The particulate material agitation and leveling system of claim 4, wherein the location along the storage tank comprises a side of the storage tank, a corner of the storage tank, or a combination thereof.

6. The particulate material agitation and leveling system of claim 1, wherein the controller is configured to determine the target weight distribution based on a user input, an initial measured weight distribution, a type of the particulate material, or a combination thereof.

7. The particulate material agitation and leveling system of claim 1, comprising a drive system coupled to the agitator, wherein the controller is configured to output a control signal to the drive system to control the agitator.

8. A particulate material agitation and leveling system, comprising:
a controller comprising a memory and a processor, wherein the controller is configured to:
receive at least one sensor signal indicative of a measured weight of a particulate material within a storage tank of an agricultural system;
select an operating mode of an agitator from an agitation mode and a leveling mode based on the measured weight, wherein the agitator is configured to be positioned between the storage tank and a metering system of the agricultural system along a vertical axis of the agricultural system; and
operate the agitator based on the operating mode.

9. The particulate material agitation and leveling system of claim 8, wherein the controller is configured to:
receive at least one sensor signal indicative of an initial measured weight of the particulate material within the storage tank; and
determine a threshold weight based on the initial measured weight.

10. The particulate material agitation and leveling system of claim 9, wherein selecting the operating mode is based on the measured weight and the threshold weight.

11. The particulate material agitation and leveling system of claim 10, wherein the controller is configured to select the agitation mode in response to the measured weight being greater than or equal to the threshold weight.

12. The particulate material agitation and leveling system of claim 10, wherein the controller is configured to select the leveling mode in response to the measured weight being less than the threshold weight.

13. The particulate material agitation and leveling system of claim 8, comprising the agitator and a drive system coupled to and configured to rotate the agitator.

14. The particulate material agitation and leveling system of claim 13, wherein the controller, while the agitation mode is selected, is configured to operate the agitator by instructing the drive system to rotate the agitator in a first direction and then in a second direction, opposite of the first direction, to agitate the particulate material.

15. The particulate material agitation and leveling system of claim 13, wherein the controller, while the leveling mode is selected, is configured to operate the agitator by instructing the drive system to rotate the agitator in a first direction and then in a second direction, opposite of the first direction, to level the particulate material.

16. The particulate material agitation and leveling system of claim 8, comprising at least one sensor communicatively coupled to the controller and configured to output the at least one sensor signal indicative of the measured weight of the particulate material within the storage tank.

17. A particulate material agitation and leveling system, comprising:
an agitator configured to be positioned between a storage tank of an agricultural system and a metering system of the agricultural system along a vertical axis of the agricultural system;
a drive system coupled to and configured to rotate the agitator;
a sensor configured to output a sensor signal indicative of a measured weight of particulate material within a storage tank configured to feed the particulate material through the agitator; and
a controller communicatively coupled to the sensor, wherein the controller comprises a memory and a processor, wherein the controller is configured to:
receive the sensor signal indicative of the measured weight of the particulate material;
select an operating mode of the agitator from an agitation mode and a leveling mode based on the measured weight; and
operate the drive system based on the operating mode.

18. The particulate material agitation and leveling system of claim 17, wherein the controller is configured to:
receive a sensor signal indicative of an initial measured weight of the particulate material within the storage tank; and
determine a threshold weight based on the initial measured weight, wherein selecting the operating mode is based on the measured weight and the threshold weight.

19. The particulate material agitation and leveling system of claim 17, wherein the controller is configured to:
determine a measured weight distribution based on the sensor signal indicative of the measured weight of the particulate material;
determine whether a determined variation between the measured weight distribution and a target weight distribution is greater than a threshold variation; and
select the leveling mode in response to determining that the determined variation is greater than the threshold variation.

20. The particulate material agitation and leveling system of claim 19, wherein the controller is configured to:
select a direction of rotation of the agitator based on the measured weight distribution; and operate the drive system based on the selected direction of rotation of the agitator.

* * * * *